(12) United States Patent
Ishida

(10) Patent No.: US 10,832,013 B2
(45) Date of Patent: Nov. 10, 2020

(54) INFORMATION PROCESSING DEVICE, INFORMATION PROCESSING METHOD OF TIME-SERIES DATA, AND PROGRAM RECORDING MEDIUM

(71) Applicant: Panasonic Intellectual Property Management Co., Ltd., Osaka (JP)

(72) Inventor: Ryo Ishida, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 16/048,281

(22) Filed: Jul. 29, 2018

(65) Prior Publication Data

US 2018/0336190 A1  Nov. 22, 2018

Related U.S. Application Data

(63) Continuation of application No. PCT/JP2017/021407, filed on Jun. 9, 2017.

(30) Foreign Application Priority Data

Jun. 30, 2016 (JP) .................................. 2016-130498

(51) Int. Cl.
*G10L 15/00* (2013.01)
*G06F 40/58* (2020.01)
(Continued)

(52) U.S. Cl.
CPC .............. *G06F 40/58* (2020.01); *G06F 40/44* (2020.01); *G06F 40/47* (2020.01); *G06N 3/0445* (2013.01);
(Continued)

(58) Field of Classification Search
CPC ....................................................... G06F 17/28
(Continued)

(56) References Cited

U.S. PATENT DOCUMENTS 9,807,473 B2 * 10/2017 Mei .......................... G06F 40/30
2015/0356075 A1 * 12/2015 Rao ....................... G06N 3/0445
705/2

(Continued)

OTHER PUBLICATIONS

International Search Report for corresponding App. No. PCT/JP2017/021407, dated Sep. 12, 2017.

(Continued)

*Primary Examiner* — Jesse S Pullias
(74) *Attorney, Agent, or Firm* — Renner, Otto, Boisselle & Sklar, LLP

(57) ABSTRACT

An information processing device acts as a neural network based on time-series data. The information processing device includes a memory and a processor. The memory stores an input variable having an ordinal number in the time-series data, and a parameter group for the neural network. The processor calculates an intermediate variable for each ordinal number based on the input variable having the ordinal number by performing transformation based on the parameter group, and calculates an output variable having the ordinal number based on the calculated intermediate variable. Upon calculating an (n+1)-th intermediate variable, the processor performs weighted sum of a calculation result of an n-th intermediate variable and a transformation result in which the n-th intermediate variable and an (n+1)-th input variable are transformed based on the parameter group, to calculate the (n+1)-th intermediate variable.

13 Claims, 9 Drawing Sheets

(51) Int. Cl.
  *G06N 3/08*     (2006.01)
  *G06N 3/04*     (2006.01)
  *G06F 40/44*    (2020.01)
  *G06F 40/47*    (2020.01)
  *G10L 15/16*    (2006.01)

(52) U.S. Cl.
  CPC ............... *G06N 3/08* (2013.01); *G06N 3/082* (2013.01); *G06N 3/084* (2013.01); *G10L 15/16* (2013.01)

(58) Field of Classification Search
  USPC .......................................................... 704/2–8
  See application file for complete search history.

(56) References Cited

U.S. PATENT DOCUMENTS

2016/0342895 A1* 11/2016 Gao .................... G06N 3/0454
2016/0350653 A1* 12/2016 Socher ..................... G06N 5/04

OTHER PUBLICATIONS

International Preliminary Report on Patentability for corresponding App. No. PCT/JP2017/021407, dated Jan. 1, 2019.
Frontiers in Distributed Representations for Natural Language Processing with its partial (passage 3.3) English translation, Mar. 1, 2016, Naoaki Okazaki pp. 189-201.
Highway Long Short-Term Memory RNNS for Distant Speech Recognition, Yu Zhang et al. Mar. 2016 pp. 5755-5759.
Training Very Deep Networks arXiv: 1507.06228, Jul. 2015, S.R. Kumar et al. (cited in Specification).
Deep Recurrent Models with Fast-Forward Connections for Neural Machine Translation arXiv: 1606.04199, Jun. 2016, Zhou Jie, et al. (cited in Specification).
Neural Machine Translation arXiv: 1409.0473, Sep. 2014, Bandanau Dzmitry et al. (cited in Specification).
RecurrentNeural Networks for Prediction: Learning Algorighms, Architectures and Stability, Danilo P. Mandic et al. ISBNs: 0-471-49517-4 (Hardback); 0-470-84535-X (Electronic).
Deep Residual Learning for Image Recognition arXiv: 1512.03385, Dec. 2015.
Highway Networks arXiv: 1505.00387, Nov. 2015.

* cited by examiner

INFORMATION PROCESSING DEVICE, INFORMATION PROCESSING METHOD OF TIME-SERIES DATA, AND PROGRAM RECORDING MEDIUM

TECHNICAL FIELD

The present disclosure relates to an information processing device, an information processing method of time-series data, and a program recording medium.

BACKGROUND ART

Non-Patent Document 1 (S. R. Kumar, et al., "Training Very Deep Networks", arXiv preprint arXiv:1507.06228, July 2015) discloses a technique for facilitating machine learning of a deep neural network. A highway network of Non-Patent Document 1 selectively skips intermediate processing of performing a nonlinear transformation and the like in order to obtain output data from input data. In Non-Patent Document 1, a Recurrent Neural Network (RNN) is mentioned as the selectively-skipped intermediate processing in the highway network. This enables the output data to be obtained from the input data without performing a recurrent series of calculation processing by the RNN within the constructed deep neural network.

Non-Patent Document 2 (Zhou Jie, et al., "Deep Recurrent Models with Fast-Forward Connections for Neural Machine Translation", arXiv preprint arXiv:1606.04199, June 2016) discloses a machine translation model of a deep neural network. In the machine translation model of Non-Patent Document 2, a connection path for passing the input data to an output side is provided so as to skip the whole recurrent calculation processing of a Long Short Term Memory (LSTM) that recurrently refers to past information in the time-series data. According to Non-Patent Document 2, the recurrent calculation processing is eliminated together with the complicated nonlinear transformation to speed up learning, thereby achieving the high-accuracy machine translation of a BLEU score of 40.4.

SUMMARY

The present disclosure provides an information processing method of time-series data and an information processing device capable of efficiently performing the information processing of the time-series data using the neural network.

An information processing device according to one aspect of the present disclosure is an information processing device that acts as a neural network based on time-series data. The information processing device includes a memory and a processor. The memory stores an input variable having an ordinal number in the time-series data, and a parameter group for the neural network. The processor calculates an intermediate variable for each ordinal number based on the input variable having the ordinal number by performing transformation based on the parameter group, and calculates an output variable having the ordinal number based on the calculated intermediate variable. Upon calculating an (n+1)-th intermediate variable, the processor performs weighted sum of a calculation result of an n-th intermediate variable and a transformation result in which the n-th intermediate variable and an (n+1)-th input variable are transformed based on the parameter group, to calculate the (n+1)-th intermediate variable.

An information processing method of time-series data according to another aspect of the present disclosure is performed by the information processing device that implements a function of the neural network.

In the information processing device and the information processing method of time-series data of the present disclosure, the calculation result of the n-th intermediate variable is taken over to the (n+1)-th intermediate variable according to the weighting, and the information processing of the time-series data can efficiently be performed using the neural network.

DETAILED DESCRIPTION OF PREFERRED EMBODIMENTS

Hereinafter, embodiments will be described in detail with reference to the drawings. However, detailed description more than necessary will occasionally be omitted. For example, detailed description of a known matter and overlapping description on a substantially identical configuration will occasionally be omitted. This is to avoid unnecessary redundancy of the following description and to facilitate understanding of those skilled in the art.

It should be noted that the applicant provides the accompanying drawings and the following description in order to enable those skilled in the art to sufficiently understand the present disclosure, but does not intend to limit the claimed subject matter to the accompanying drawings and the following description.

First Embodiment

The present disclosure discloses a recurrent highway network (hereinafter, referred to as an "RHN") that is a new architecture of machine learning using a neural network. The RHN according to the present disclosure can be applied to various kinds of information processing targeting time-series data, such as speech recognition processing and machine translation processing. The time-series data is data constructed with a sequence of data elements having order in a time-series direction. The order of the time-series data is not particularly limited to what means time, but is set appropriately according to target data and information processing. An example in which the RHN is applied to machine translation using deep learning will be described below.

1. Configuration

An information processing method of time-series data and a configuration of an information processing device according to a first embodiment will be described below.

1-1. Overview

Figure 1:
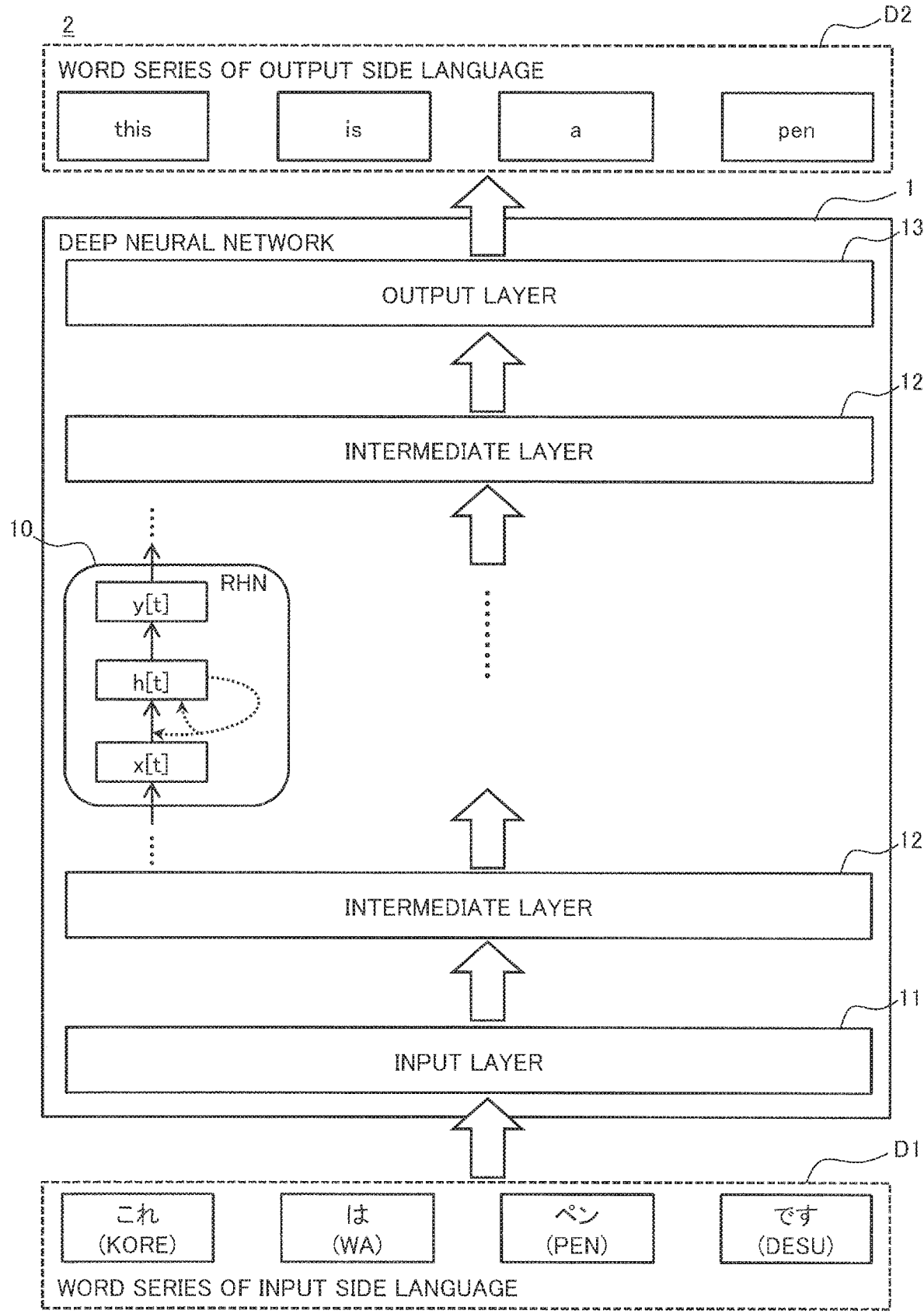
FIG. 1 is a view illustrating an overview of an information processing method of time-series data according to a first embodiment.

In the first embodiment, a deep neural network for the machine translation using the deep learning is constructed with the RHN. An overview of information processing using the deep neural network of the first embodiment will be described with reference to FIG. 1. FIG. 1 is a view illustrating an overview of the information processing method of time-series data according to the first embodiment.

As shown in FIG. 1, a deep neural network 1 of the first embodiment includes an input layer 11, a plurality of intermediate layers 12, and an output layer 13. The layers 11, 12, 13 act as a data buffers that hold pieces of data during input, processing, and output, respectively. For example, the deep neural network 1 is implemented in an information processing device 2.

As illustrated in FIG. 1, the deep neural network 1 according to the first embodiment performs the machine translation from an input-side language to an output-side language based on time-series data D1 of an input sentence, to output time-series data D2 of an translated sentence (neural machine translation processing). FIG. 1 illustrates an example of translation from Japanese to English. The input-side language and the output-side language may be set to various natural languages.

In the first embodiment, the time-series data D1 of the input sentence is constructed with a word series of the input-side language (Japanese). For example, in a case where the input sentence is "kore wa pen desu", each of the words "kore", "wa", "pen" and "desu" in the input sentence is a data element of the time-series data D1. The order of the word series is the arrangement order (ascending order or descending order) of the words in the input sentence.

The time-series data D1 of the input sentence is input to the input layer 11 of the deep neural network 1 in a form of a vector sequence in which each data element is expressed by a vector. For example, each word in the time-series data D1 of the input sentence is expressed by 1-of-K expression based on a number of vocabularies K of the input-side language. The 1-of-K expression is a vector expression in which only a component corresponding to a word on one-to-one basis is set to "1" while other components are set to "0" in a K-dimensional vector space. For example, the vector expression of the time-series data D1 is generated by referring to information indicating the vocabulary of the input-side language in the information processing device 2 from text data of the input sentence.

Based on the time-series data D1 input to the input layer 11, the deep neural network 1 performs various vector calculations for the machine translation through each intermediate layer 12 in a stepwise manner. In calculation processing in the intermediate layer 12, a linear transformation, a nonlinear transformation and the like are calculated based on a parameter group trained in a machine learning in the order indicated by the time-series data. At this point, complicated processing of considering past input, an intermediate state (internal state), and output in the order of the time-series data is performed.

Based on a calculation result in the intermediate layer 12, the output layer 13 of the deep neural network 1 outputs the time-series data D2 of a translated sentence indicating a translation result of the time-series data D1 of the input sentence. For example, in a case where the translated sentence is "this is a pen", the time-series data D2 of the vector expression expressing the word series "this", "is", "a" and "pen" is output from the output layer 13. For example, the information processing device 2 generates the translated sentence of the text data from the time-series data D2 of the vector expression by referring to the information indicating the vocabulary of the output-side language.

As shown in FIG. 1, the deep neural network 1 according to the first embodiment includes an RHN 10. The RHN 10 includes an input layer holding an input variable x[t] corresponding to an order t (t is a natural number) in the time-series data, an intermediate layer holding an intermediate variable h[t], and an output layer holding an output variable y[t]. Each layer of the RHN 10 is configured integrally with one of the input layer 11, the intermediate layer 12, and the output layer 13 of the deep neural network 1. Consequently, the RHN 10 is incorporated in the deep neural network 1. The RHN 10 may be incorporated in the deep neural network 1 as a module, or referred to as a library. Details of the RHN 10 will be described later.

In the information processing method of time-series data according to the first embodiment, the RHN 10 facilitates reference of the currently-processed information about past data elements based on the time-series data in the deep neural network 1. A configuration of the information processing device 2 that performs the information processing method of time-series data according to the first embodiment will be described below.

1-2. Hardware Configuration

Figure 2:
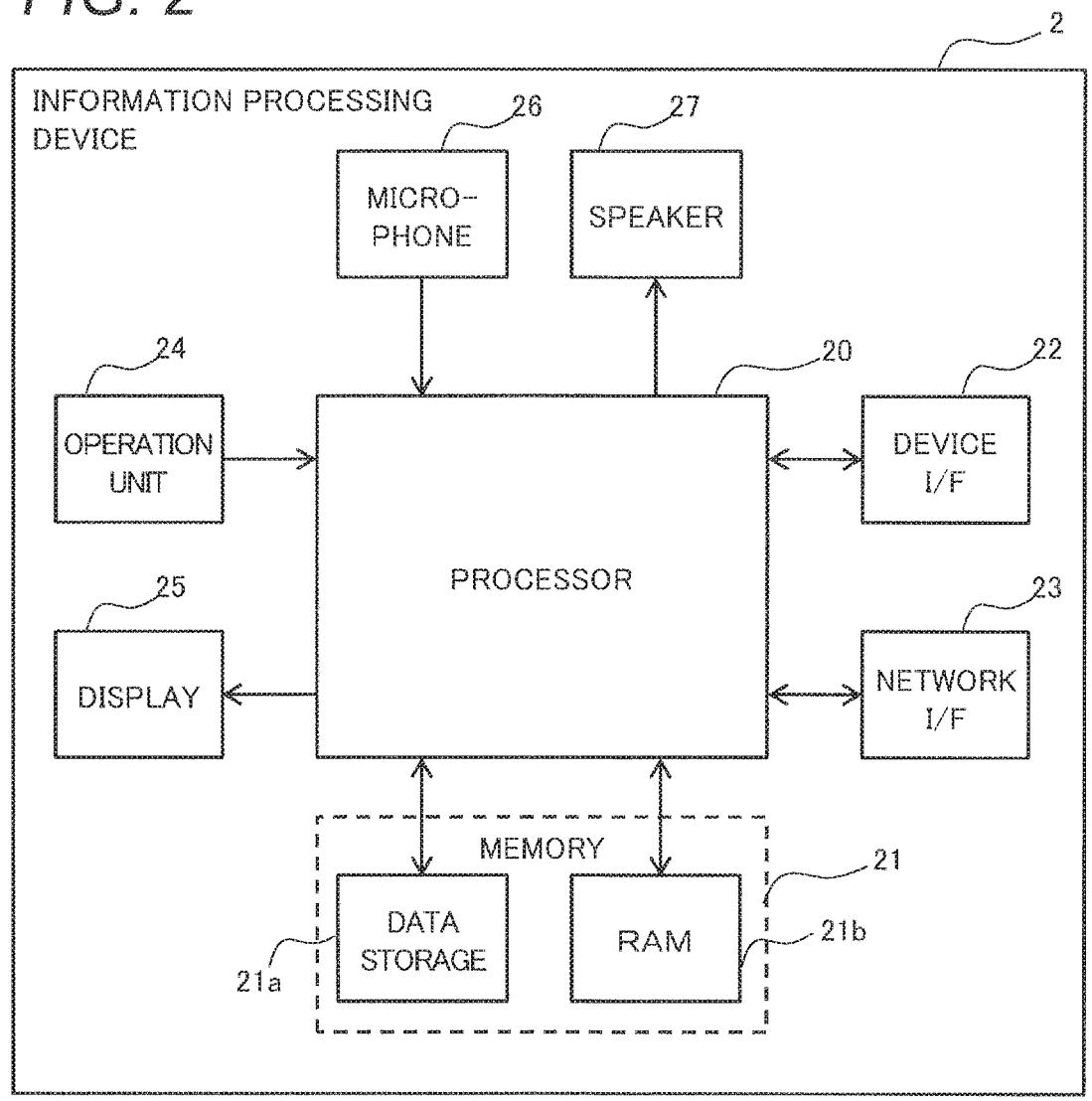
FIG. 2 is a block diagram illustrating a configuration of an information processing device of the first embodiment.

A hardware configuration of the information processing device 2 according to the first embodiment will be described with reference to FIG. 2. FIG. 2 is a block diagram illustrating the configuration of the information processing device 2.

For example, the information processing device 2 is constructed with a Personal Computer (PC). As shown in FIG. 2, the information processing device 2 includes a processor 20, a memory 21, a device interface 22, and a network interface 23 (hereinafter, "interface" is referred to as "I/F"). The information processing device 2 also includes an operation unit 24, a display 25, a microphone 26, and a speaker 27.

The processor 20 includes, for example, a CPU and a GPU, which implements a predetermined function in cooperation with software, and controls whole operation of the information processing device 2. The processor 20 reads data and programs, which are stored in the memory 21, performs various calculation processing, and implements various functions. For example, the processor 20 executes a program implementing the deep neural network 1 and the RHN 10 according to the first embodiment. The program may be provided from a network or stored in a recording medium having portability.

The processor 20 may be a hardware circuit such as a dedicated electronic circuit designed to implement the predetermined function or a reconfigurable electronic circuit. The processor 20 may be constructed with various semiconductor integrated circuits such as a CPU, an MPU, a GPU, a GPGPU, a TPU, a microcomputer, a DSP, an FPGA, and an ASIC.

The memory 21 is a storage medium that stores the program and data necessary for the implementation of the functions of the information processing device 2. For example, the memory 21 stores the parameter group which is the training object in the machine learning of the neural network. As shown in FIG. 2, the memory 21 includes a data storage 21a and a RAM 21b.

The data storage 21a stores a parameter, data, a control program and the like necessary for the implementation of the predetermined function. The data storage 21a is constructed with, for example, a Hard Disk Drive (HDD) or a Semiconductor Storage Device (SSD). For example, the data storage 21a stores the programs of the deep neural network 1 and the RHN 10, a (trained) parameter group, information indicating the vocabularies of the input-side language and the output-side language, a bilingual corpus, and the like.

The RAM 21b is constructed with a semiconductor device such as a DRAM or an SRAM, and temporarily stores (holds) data. The RAM 21b may act as a work area of the processor 20. For example, the pieces of time-series data D1, D2 of the input sentence and the translated sentence, various variables x[t], h[t], h[t−1], y[t], and the parameter group of the training object are held in the RAM 21b. In a case where the calculation is performed at high rate with the GPU, the parameter group and the currently-calculated intermediate state are held in a memory area (an example of the memory) on the GPU.

A device I/F 22 is a circuit (module) that connects other devices to the information processing device 2. The device I/F 22 conducts communication according to a predetermined communication standard. For example, the predetermined communication standard includes USB, HDMI (registered trademark), IEEE1395, WiFi, and Bluetooth (registered trademark).

The network I/F 23 is a circuit (module) that connects the device 1 to the network through a wireless or wired communication line. The network I/F 23 conducts communication according to a predetermined communication standard. For example, the predetermined communication standard includes a communication standard such as IEEE802.3 and IEEE802.11a/11b/11g/11ac.

The operation unit 24 is a user interface with which a user operates. For example, the operation unit 24 is constructed with a keyboard, a touch pad, a touch panel, buttons, switches, and combinations thereof. The operation unit 24 is an exemplary acquisition unit that acquires various information input by the user.

The display 25 is constructed with a liquid crystal display or an organic EL display, for example. The display 25 displays various information such as information input from the operation unit 24.

The microphone 26 is an exemplary acquisition unit that collects sound to generate voice data. The information processing device 2 may have a voice recognition function. For example, the information processing device 2 may perform voice recognition of the voice data generated with the microphone 26, to transform the voice data into the text data.

The speaker 27 outputs the voice data as voice sound. The information processing device 2 may have a voice synthesizing function. For example, the information processing device 2 may perform voice synthesis of the text data based on the machine translation to output the voice from the speaker 27.

One example of the information processing device 2 constructed with the PC is described above. The information processing device 2 of the present disclosure is not limited to the PC, but may have various device configurations. For example, the information processing device 2 may be one or a plurality of server devices such as an ASP server. For example, the information processing device 2 may acquire the time-series data D1 of the input sentence input through the network using the network I/F 23 (an example of the acquisition unit), and perform the machine translation using the deep neural network 1. The information processing device 2 may transmit the time-series data D2 of the translated sentence generated by the machine translation through the network. The information processing of time-series data according to the present disclosure may be performed in a computer cluster, cloud computing, or the like.

2. Operation

Operation of the information processing device 2 of the first embodiment will be described below.

2-1. Neural Machine Translation Processing

Figure 3:
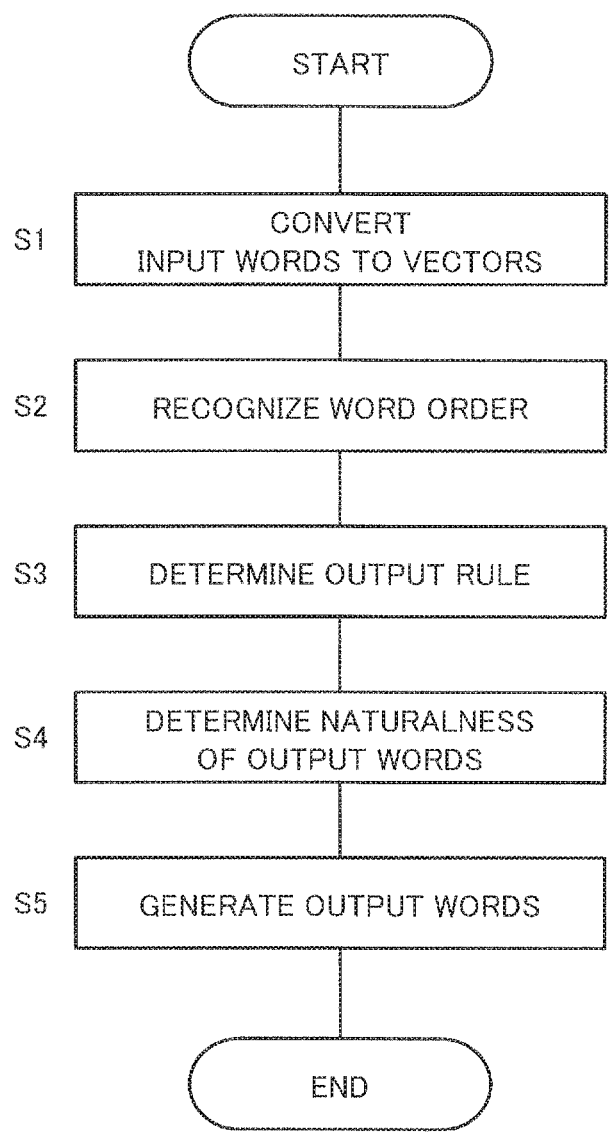
FIG. 3 is a flowchart illustrating neural machine translation processing by the information processing device.

The machine translation operation by the information processing device 2 will be described with reference to FIG. 3. FIG. 3 is a flowchart illustrating neural machine translating processing of the first embodiment.

The neural machine translation processing is processing in which the processor 20 performs the machine translation using the deep neural network 1 constructed in the information processing device 2. The information processing device 1 acquires the time-series data D1 of the input sentence through the operation unit 24, the microphone 26, or the various I/Fs 22, 23, thereby starting the neural machine translation processing in FIG. 3.

First, the processor 20 acts as the input layer 11 in the deep neural network 1 (see FIG. 1), and converts the input word in the word series of the time-series data D1 of the input sentence into a vector variable (step S1).

In the processing of step S1, the processor 20 performs linear transformation on the 1-of-K expression of the input word to convert the input word into the vector variable in each word. The linear transformation is performed by a parameter matrix that has parameters of training object as matrix elements. The number of dimensions of the transformed vector variable can be set arbitrarily. For example, by setting the vector variable to the number of dimensions smaller than the number of vocabularies K, the calculation processing can be performed in a vector space indicating some sort of semantic structure projected from a vocabulary space.

Next, based on the time-series data of the vector variable, the processor 20 acts as a bi-directional RNN and recognizes the word order in the input sentence (step S2). The RNN sequentially performs the calculation processing on each vector of the time-series data while performing feedback in the intermediate layer of the three-layer neural network. The bi-directional RNN is implemented by parallelly providing the RNN performed in ascending order of the vector sequence in the time-series data and the RNN performed in descending order thereof. The processing in step S2 results in generating the vector sequence in which the input sentence is interpreted (parsed).

The processing in step S2 is not limited to the bi-directional RNN, but may be implemented by, for example, a bi-directional LSTM. The LSTM has a function of deleting a part of a feedback content in the RNN. The bi-directional LSTM is implemented by applying the LSTM instead of the RNN in the bi-directional RNN. The processing in step S2 may be performed by applying the RHN 10 of the first embodiment instead of the RNN (or the LSTM) in the bi-directional RNN (or the bi-directional LSTM).

Next, the processor 20 performs attention processing of applying an existing technique called attention (for example, see Non-Patent Document 3: Bahdanau Dzmitry, et al., "Neural Machine Translation by Jointly Learning to Align and Translate", arXiv preprint arXiv:1409.0473, September 2014), to determine an output rule to a subsequent stage (step S3). The output rule regulates the noteworthy word for translation and a degree of attention in the word series on the input side when the subsequent processing (S4) is performed.

Specifically, in the attention processing in step S3, the processor 20 refers to the output in step S2 and the past internal state in step S4, and sequentially generates a set of weights 0 to 1 in which a sum of the weights calculated from the vector sequences in step S2 is 1. The processor 20 performs a weighted average of the vector sequences calculated in step S2 using the generated set of weights 0 to 1, and sequentially sets the input variables to be processed in step S4.

Next, the processor 20 acts as the RHN 10 of the first embodiment for example, and performs processing of determining naturalness of the output word based on the sequentially-set input variable (step S4).

Specifically, the processor 20, at first, calculates the intermediate variable as the internal state in the order of the set input variable. Then, the processor 20 sequentially outputs the vector variable corresponding to the output word based on the current input variable, the current and past internal states, the past output result, and the like. The processing in step S4 may be performed using the RNN or the LSTM instead of the RHN 10. Details of processing using the RHN 10 will be described later.

Next, the processor 20 acts as the output layer 13 in the deep neural network 1, and generates information indicating the output word of the translation result by the output-side language (step S5). Specifically, the processor performs the linear transformation in each vector variable output in the processing in step S4. Further, the processor 20 calculates the nonlinear transformation with respect to the linear transformation result based on a Softmax function, and outputs the output word corresponding to the vector of the calculation result.

In step S5, the processor 20 outputs information indicating start and end of the translated sentence as well as each output word in the translated sentence. The processor 20 outputs the information indicating the end of the translated sentence, thereby ending the processing of the flowchart.

In the above processing, the machine translation from the input-side language to the output-side language is performed using the deep neural network 1. The machine translation can be performed with high accuracy by properly optimizing the parameter group of the training object in the deep neural network 1.

In order to learn various parameter groups in the deep neural network 1, the processor 20 refers to the bilingual corpus stored in advance in the memory 21, and calculates an error of the output result of step S5 of the flowchart in FIG. 3 from the correct translated sentence. According to a back propagation method, the processor 20 sequentially optimizes the parameter group used in the calculation processing between layers from the side of the output layer 13 to the side of the input layer 11.

2-2. Recurrent Highway Network (RHN)

Figure 4:
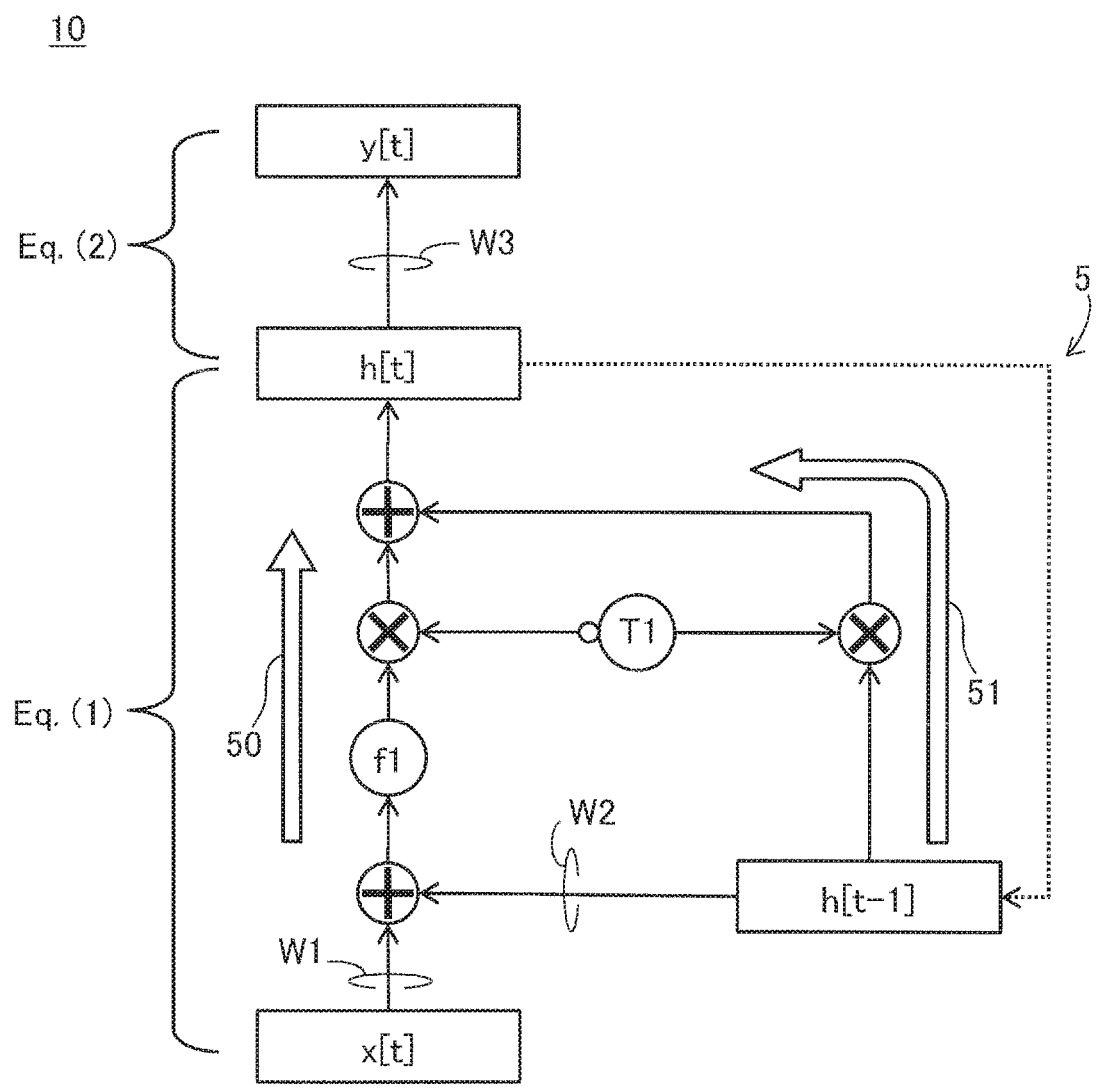
FIG. 4 is a diagram illustrating a calculation algorithm of a Recurrent Highway Network (RHN) of the first embodiment.

An RHN 10 of the first embodiment will be described with reference to FIG. 4. FIG. 4 is a diagram illustrating a calculation algorithm of the RHN 10 of the first embodiment.

FIG. 4 schematically illustrates the calculation algorithm of the RHN 10. The processor 20 sequentially performs the calculation processing according to the following equations (1) and (2) in order t (ordinal number) in time-series data, thereby implementing the RHN 10.

$$h[t]=T1 \times h[t-1]+(1-T1) \times f1 \quad (1)$$

$$y[t]=W3 \cdot h[t] \quad (2)$$

In the equations (1) and (2), each of a t-th input variable $x[t]$, an intermediate variable $h[t]$, and an output variable $y[t]$ are a vector variable respectively. A (t−1)-th intermediate variable $h[t-1]$ is a vector variable having the same dimension as the t-th intermediate variable $h[t]$. An activation function f1 and a transfer function T1 are a vector value function in which an argument is a vector variable. For example, the argument of the activation function f1 in the equation (1) is given by the following equation (3).

$$f1=f1(W1 \cdot x[t]+W2 \cdot h[t-1]) \quad (3)$$

In the equation (3), parameter matrices W1, W2 have the same numbers of columns as the numbers of dimensions of the vector variables $x[t]$ and $h[t-1]$, respectively, and have the same number of rows as the number of dimensions of the intermediate variable $h[t]$. In the equation (2), a parameter matrix W3 has the same number of columns as the number of dimensions of the intermediate variable $h[t]$, and has the same number of rows as the number of dimensions of the output variable $y[t]$. Each of the parameter matrices W1 to W3 is an example of the parameter group to be trained by the machine learning in the first embodiment. Note that the argument of the activation function f1 may be set while a bias term is appropriately added.

"·" in each equation defines a product between a matrix and a vector, and represents a calculation of the linear transformation of a vector by the matrix. For example, "W1·x[t]" has the same number of dimensions as the number of rows of the parameter matrix W1, and is a vector indicating the result of the linear transformation of the input variable $x[t]$ by the parameter matrix W1. The processor 20 acts as a linear transformation unit that performs the linear transformation.

"×" represents element-wise multiplication of vectors. A product "V1×V2" of two vectors V1 and V2 is a vector, and represents a product (what is called a Hadamard product) between the same components of the vectors V1, V2 in each component. The product "V1×V2" is obtained by multiplying the same components in each component of the vectors V1, V2. The processor 20 acts as a multiplier that performs this element-wise multiplication. "+" represents element-wise summation of vectors. A sum "V1+V2" is obtained by adding the same components in each component of the vectors V1, V2. The processor 20 acts as an adder that performs this element-wise summation.

The activation function f1 is a function that performs the nonlinear transformation on the linear transformation result of the vector variable in order to enable a complicated function, which cannot be expressed only by the linear transformation, to be expressed. The processor 20 acts as a nonlinear transformation unit that performs the nonlinear transformation using the activation function f1 (the same applies hereinafter). For example, a sigmoid function F(z) expressed by the following equation (4) using an argument z is used as the activation function f1.

$$F(z)=1/(1+\exp(-z)) \quad (4)$$

In the equation (4), $\exp(z)$ is an exponential function. The activation function f1 performs the nonlinear transformation such as the above equation (4) in each component of the argument being the vector variable (equation (3)), and has a vector value as each transformation result. By using the sigmoid function as the activation function f1, the activation function f1 normalizes each component value of the argument within the range of 0 to 1. The activation function f1 is not limited to the sigmoid function, but various functions may be used. For example, ReLU (Rectified Linear Unit) or tan h (hyperbolic tangent function) may be used as the activation function f1.

The transfer function T1 is a function that sets a degree for transferring information included in a specific calculation result, such as the (t−1)-th (i.e. delayed) intermediate variable h[t−1], to the output side. The processor 20 acts as a function calculator that calculates the transfer function T1 (the same applies hereinafter). The transfer function T1 takes an argument such as the t-th (i.e. current) input variable x[t], and is defined by the parameter group of the machine learning. For example, the transfer function T1 is defined as an activation function f with a parameter matrix W4 incorporated as indicated by the following equation (5).

$$T1=T1(x[t])=f(W4 \cdot x[t]) \qquad (5)$$

As the activation function f in the equation (5), various activation functions can be used e.g., the sigmoid function and the ReLU. The nonlinear transformation in the equation (5) is performed on each component of the argument "W4·x[t]" similarly to the activation function f1.

The range of each component value of the transfer function T1 is, for example, set as 0 to 1, −1 to 1 and the like. The range may appropriately be set according to the activation function to be used. The argument of the transfer function T1 may be the (t−1)-th intermediate variable h[t−1], the output variable y[t−1], or a combination of various variables identical or prior to the t-th or (t−1)-th variable.

The parameter matrix W4 has the same number of columns as the number of dimensions of the input variable x[t], and has the same number of rows as the number of dimensions of the intermediate variable h[t]. The parameter matrix W4 is an example of the parameter group of the machine learning in the present embodiment.

In order to implement the function of the RHN 10, the processor 20 performs the calculation according to the equation (1) in the order t to calculate the t-th intermediate variable h[t] from the t-th input variable x[t]. At this point, the processor 20 appropriately performs the nonlinear transformation using the functions f1, T1. Then, the processor 20 performs the calculation according to the equation (2) to calculate the t-th output variable y[t] from the t-th intermediate variable h[t].

As illustrated in FIG. 4, the RHN 10 has a feedback loop 5 with respect to the equation (1). The feedback loop 5 is an calculation loop in which the previous intermediate variable h[t−1] is fed back to calculate the t-th intermediate variable h[t] in the calculation processing of the t-th equation (1). In the determination of the current (i.e. t-th) output variable y[t], the feedback loop 5 can reflect the information about the past internal state using the delayed (i.e. (t−1)-th) intermediate variable h[t−1].

For example, the processor 20 holds the calculation result of the intermediate variable h[t] in the memory 21 every time the intermediate variable h[t] is calculated in each piece of calculation processing, and refers to the held calculation result as the delayed intermediate variable h[t−1] in the next calculation processing. For the calculation processing of the first time (t=1), h[0]=0 is set in advance, for example. The memory 21 includes the input layer, the intermediate layer, and the output layer in the RHN 10 in order to store (hold) the input variable x[t], the intermediate variable h[t] (and h[t−1]), and the output variable y[t].

As illustrated in FIG. 4, the RHN 10 of the present embodiment has first and second paths 50, 51 based on the equation (1) within the feedback loop 5. The first and second paths 50, 51 correspond to the respective terms in the equation (1), and are information transmission paths through which the information about the past internal state by the delayed intermediate variable h[t−1] and the like are transmitted to the current intermediate variable h[t]. The processor 20 includes a first gate (corresponding to the calculation of the second term of the equation (1)) including the multiplier in the first path 50 and a second gate (corresponding to the calculation of the first term of the equation (1)) including the multiplier in the second path 51 as a functional configuration implementing the RHN 10.

In the first path 50, the current input variable x[t] is linearly transformed by the parameter matrix W1 and the previous intermediate variable h[t−1] is linearly transformed by the parameter matrix W2 as shown in FIG. 4. Further, the sum of the linearly-transformed variables "W1·x[t]" and "W2·h[t−1]" is nonlinearly transformed by the activation function f1 (see the equation (3)). In the transformation result for the input variable x[t] and the previous intermediate variable h[t−1], the processor 20 controls the information to be included in the current intermediate variable h[t] through the first path 50 (see the second term of the equation (1)).

On the other hand, in the second path 51, the calculation result of the intermediate variable h[t−1] through the previous calculation processing is maintained particularly without performing the linear transformation and the nonlinear transformation as illustrated in FIG. 4. In this state, the previous intermediate variable h[t−1] is multiplied by the transfer function T1 as a weighting (the first term of the equation (1)). The weighting value is set by calculating the transfer function T1 based on the argument such as the current input variable x[t]. Consequently, the processor 20 controls, as the second gate, the information to be extracted from the calculation result of the previous intermediate variable h[t−1] through the second path 51 so as to take over the current intermediate variable h[t] from the previous intermediate variable h[t−1].

In the first gate, the activation function f1 of various transformation results is multiplied by a weighting (1−T1) complementary to the weighting (T1) of the second path 51 in the first path 50 (the second term of the equation (1)). Thus, in the weighting based on the transfer function T1, the weighted sum is performed on the various transformation results in the first path 50 and the calculation result of the previous calculation processing in the second path 51, thereby calculating the current intermediate variable h[t] (see the equation (1)).

In the first path 50, various transformations are performed on the previous intermediate variable h[t−1] together with the current input variable x[t], so that the past information can diversely be reflected based on the previous intermediate variable h[t−1]. However, the first path 50 has a tradeoff due to performing the calculation processing in the order, various transforms being repeatedly performed on an intermediate variable h[n] of a specific ordinal number n every time the calculation processing is performed. In particular, the nonlinear transformation is problematic since it is irreversible. That is, in the first path 50, the problem would occur that the past information before the last time is lost as far from the current time.

In contrast to this, the second path 51 can reduce the loss of the information about the far past, since only the multiplication of the weighting (T1) is performed repeatedly on the intermediate variable h[n] of the specific ordinal number n in performing the calculation processing in the order. For example, by setting the transfer function T1 in equation (1) to 1 (h[n+1]=h[n]), the information about the past internal state can be directly taken over.

As described above, in the RHN 10 of the present embodiment, the information about the past internal state is taken over by the current intermediate variable h[t] while the calculation result of the previous intermediate variable h[t−1] is maintained in each piece of calculation processing by the second path 51, and the information about the past internal state can infinitely be referred to. In the RHN 10, the past internal state can be referred to without any transformation including the sum, the linear transformation, and the nonlinear transformation. Optimization in the machine learning is facilitated by solving only the past internal state that is not expressed by the non-transformed past internal state using various calculations of the first path 50.

In the present embodiment, the transfer function T1 changes the weightings of the first and second paths 50, 51 based on the argument such as the current input variable x[t], so that the information transmitted from the first and second paths 50, 51 to the output side can properly be selected. A method for selecting the information transmitted from the first and second paths 50, 51 can be updated by the machine learning because the transfer function T1 is defined by the parameter matrix W4. Further, in the present embodiment, the weighting by the transfer function T1 is complementarily set to each of the first and second paths 50, 51. Consequently, necessary information can be selected while an increase in calculation amount is suppressed in conjunction with each of the first and second paths 50, 51.

The case that the RHN 10 of the present application is applied to step S4 in the neural machine translation processing of FIG. 3 will be described below.

When the RHN 10 is applied to step S4 in FIG. 3, the data selected through the attention processing in step S3 is sequentially input to the input layer of the RHN 10 (x[1], x[2], . . . , x[t]).

For example, in a case where one word "menzei" is included in the input sentence and translated into two words "tax free" in the output sentence, the identical-value input variables x[t1] and x[t2] expressing the "menzei" are sequentially input to the RHN through the attention processing (S3). Based on the input variable x[t1] expressing the first-time "menzei", the intermediate variable h[t1] is calculated by the calculation processing through the first path 50, and the output variable y[t1] is calculated so as to express the word "tax".

Then, the value of the transfer function T1 based on the input variable x[t2] becomes, for example, 0.5 in order to obtain the output variable y[t2] expressing the word "free" based on the input variable x[t2] expressing the second-time "menzei". Consequently, information is transmitted from both the first and second paths 50, 51 to the output side, and the output variable y[t2] can properly be determined using the fact that the current translation target is "menzei" (x[t2]) and information (h[t2-1]) about a history that "tax" is output in the past.

In the machine translation, sometimes a relationship between the input sentence and the translated sentence is a many-to-one relationship. For example, in the case of the machine translation of the input sentences "onegai shimasu", "onegai sasete itadakimasu", and "onegai itashimashita" to one output sentence "Please", the above relationship is a three-to-one relationship. In this case, the input variable x[t] expressing information unnecessary for the translation is sequentially input. Therefore, the value of the transfer function T1 becomes 1 when the input variable x[t] expressing information such as "shimasu", "sasete itadakimasu", or "itashimashita" in the input sentence is input, which allows the information unnecessary for translation to be ignored in the translation processing.

When translating the input word like "sakana" into the output word "fish" in response to the input sentence "watashi wa sakana ga suki desu (I like fish)" or "kare wa sakana ga suki desu (he likes fish)", the current translation does not need to refer to the past translation of "watashi" into "I" or of "kare" into "he". In such cases, the value of the transfer function T1 becomes 0 based on the input variable x[t] expressing the input word "sakana", so that past information can be blocked from the second path 51 while the transformation result of the input variable x[t] from the first path 50 is used.

As described above, the machine translation that matches human intuition can be implemented by applying the RHN 10 to the neural machine translation processing.

3. Effects and the Like

In the first embodiment, the information processing device 2 acts as the RHN 10 in the deep neural network 1 based on the time-series data D1. The information processing device 2 includes the memory 21 and the processor 20. The memory 21 stores the input variable x[t] having the ordinal number t in the vector sequence of the time-series data and the parameter matrices W1 to W4 for acting as the RHN 10. The processor 20 calculates an intermediate variable h[t] for each ordinal number t based on the input variable x[t] having the ordinal number by performing transformation based on the parameter matrices W1 to W3, and calculates an output variable y[t] having the ordinal number based on the calculated intermediate variable h[t]. The processor 20 performs the weighted sum in the feedback loop 5 in which the (n+1)-th intermediate variable h[n+1] is calculated (n is a natural number) (equation (1)). The processor 20 performs the weighted sum of the calculation result (51) of the n-th intermediate variable h[n] and the transformation result (50) in which the n-th intermediate variable h[n] and the (n+1)-th input variable x[n] are transformed based on the parameter matrices W2, W1, to calculate the (n+1)-th intermediate variable h[n+1].

In the information processing device 1, the second path 51 is configured together with the first path 50 in the feedback loop 5 in which the (n+1)-th intermediate variable h[n+1] is calculated. In the second path 51, the calculation result of the n-th intermediate variable h[n] is taken over by the (n+1)-th intermediate variable h[n+1] according to the weighting, and the time-series data information processing or the machine learning can efficiently be performed using the deep neural network 1.

In the first embodiment, the processor 20 performs the weighted sum upon the calculation of the (n+1)-th intermediate variable h[n+1] in the weighting (T1, 1−T1) based on the transfer function T1 being a first transfer function defined by the parameter matrix W4. Consequently, the information selected by the weighted sum in the machine learning can be optimized by updating the parameter matrix W4.

In the first embodiment, the argument of the transfer function T1 includes at least one of the input variable x[t] whose ordinal number t is identical or prior to the (n+1)-th (t≤n+1), the intermediate variable h[t−1] whose ordinal number (t−1) is identical or prior to the n-th, and the output variable y[t−1] whose ordinal number (t−1) is identical or prior to the n-th. Consequently, the weighting by the transfer function T1 changes according to various variables taking as the arguments, and the information about the past internal state can properly be referred to according to the order t of the time-series data.

In the first embodiment, the time-series data D1 includes data expressing the input-side language that is the natural language. The information processing device 2 performs the machine translation of the natural language based on the processing performed by the processor 20. The information processing device 2 can efficiently perform the machine translation using the RHN 10.

The information processing method of time-series data of the first embodiment is performed by the information processing device 2 that implements the function of the RHN 10 in the deep neural network 1. The parameter matrices W1 to W3 for the RHN 10 are stored in the memory 21 of the information processing device 2. The information processing method of time-series data includes a step in which the information processing device 2 acquires the input variable x[t] in the order t in the time-series data. The method includes acquiring, by the information processing device 2, an input variable having x[t] an ordinal number t in time-series data. The method includes calculating, by the information processing device 2, an intermediate variable h[t] for each ordinal number based on the input variable x[t] of corresponding order by performing transformation based on the parameter matrices W1, W2. The method includes calculating, by the information processing device 2, an output variable x[t] for each ordinal number on the intermediate variable h[t] of corresponding order by performing transformation based on the parameter matrix W3. Upon calculating an (n+1)-th intermediate variable h[n+1], the (n+1)-th intermediate variable h[n+1] is calculated by performing weighted sum of a calculation result of an n-th intermediate variable h[n] and a transformation result in which the n-th intermediate variable h[n] and an (n+1)-th input variable x[n+1] are transformed based on the parameter matrices W1, W2.

In the information processing method of time-series data, the calculation result of the n-th intermediate variable h[n] is taken over to the (n+1)-th intermediate variable h[n+1] according to the weighting, and the time-series data information processing can efficiently be performed using the deep neural network 1.

The program of the embodiment is a program that causes the information processing device 2 to perform the information processing method of time-series data. This enables the time-series data information processing to be efficiently performed by the information processing device 2.

Second Embodiment

A second embodiment will be described below with reference to the drawings. Further to the RHN 10 of the first embodiment, an RHN 10A in which a bypass is further provided for transmitting information about the input variable x[t] to the output variable y[t] will be described in the second embodiment.

The information processing device 2 of the second embodiment will be described below while the configuration and operation similar to those of the information processing device 2 of the first embodiment are appropriately omitted.

Figure 5:
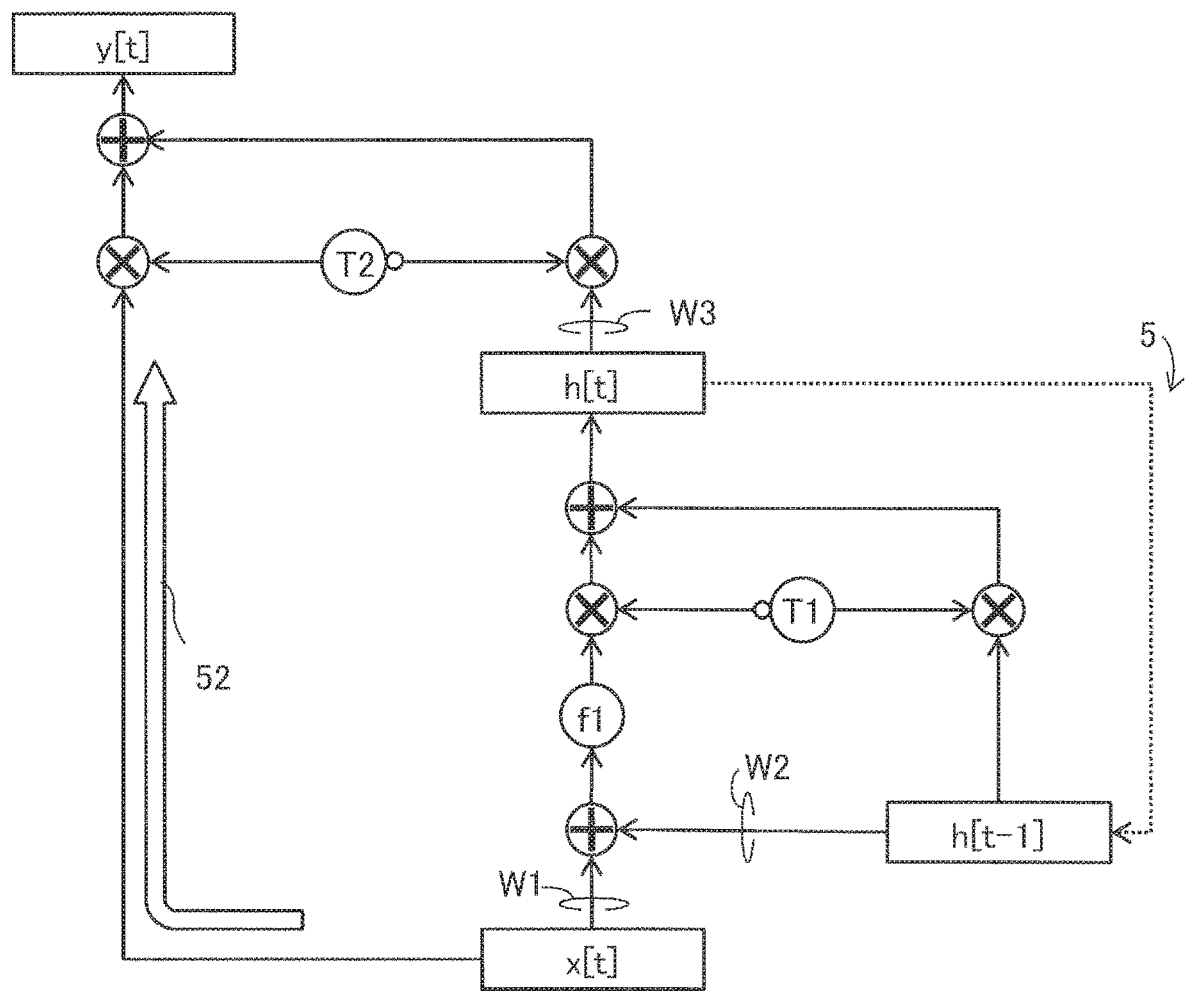
FIG. 5 is a diagram illustrating a calculation algorithm of an RHN according to a second embodiment.

FIG. 5 is a diagram illustrating a calculation algorithm of the RHN 10A of the second embodiment. In the RHN 10A of the second embodiment, the following equation (6) is adopted instead of the equation (2) of the first embodiment.

$$y[t]=(1-T2)\times W3\cdot h[t]+T2\times x[t] \quad (6)$$

In the equation (6), a transfer function T2 is defined by the parameter group of the training object similarly to the transfer function T1 of the equation (1). The argument of the transfer function T2 is the current input variable x[t], the intermediate variable h[t], the previous output variable y[t−1], or a combination thereof, for example.

In the equation (6), it is assumed that the input variable x[t] and the output variable y[t] have the same number of dimensions. In a case where the input variable x[t] and the output variable y[t] have different numbers of dimensions, linear transformation and the like are appropriately performed such that the number of dimensions of the second term in the equation (6) is matched with the number of dimensions of the output variable y[t].

As illustrated in FIG. 5, the RHN 10A of the second embodiment has a bypass 52 of the information transmission based on Equation (6). The detour path 52 corresponds to the second term of the equation (6), and thus provides an information transmission path through which the information about the input variable x[t] is transmitted to the output variable y[t] with no use of the intermediate variable h[t]. The processor 20 further includes an output gate that controls information transmitted to the output variable y[t] through the bypass 52 as a functional configuration implementing the RHN 10A (corresponding to the right-side calculation in the equation (6)).

According to the equation (6) constituting the bypass 52, the processor 20 performs the weighted sum of the current input variable x[t] and the intermediate variable h[t] in complementary weighting based on the transfer function T2, to perform the calculation processing of calculating the output variable y[t].

The bypass 52 can avoid a situation in which identical mapping is hardly acquired by the nonlinear transformation for calculating the intermediate variable h[t]. Thus, for example, the deep neural network 1 for the machine translation can easily learn a correspondence relationship such as the input word "kohhi" and the output word "coffee", which corresponds to a one-to-one relationship between the input and the output. In addition, it is possible to avoid an excessive transformation in a state in which a sufficiently good transformation result has already been obtained, or loss of information through an unnecessary transformation.

As described above, in the information processing device 2 of the second embodiment, the processor 20 performs the weighted sum of the input variable x[t] for each ordinal number t and the transformed intermediate variable h[t] of the same order t based on the parameter matrix W3, in weighting based on the transfer function T2 being a second transfer function. Consequently, the processor 20 calculates the output variables y[t] in the order. As a result, in the machine translation, it is possible to avoid the situation in which the identical mapping is hardly acquired by the calculation of the intermediate variable h[t] that performs the nonlinear transformation.

By incorporating the RHN 10A of the second embodiment in the deep neural network 1, the training of the parameter group on the input layer side can be promoted, as the layer for calculation of the intermediate variable h[t] is skipped at the training by the bypass 52 based on the equation (6). This enables the layer of the preceding stage to be trained as fast as the layer of the subsequent stage, so that it can be avoided that the training of the subsequent stage has to be done again due to the result of later training of the preceding stage can be avoided.

In the RHN 10A of the second embodiment, various calculation processing may be incorporated if the states of $y[t]=x[t]$ and $h[t-1]=h[t]$ are feasible based on the transfer functions T2 and T1. Such modifications will be described with reference to FIGS. 6 and 7.

Figure 6:
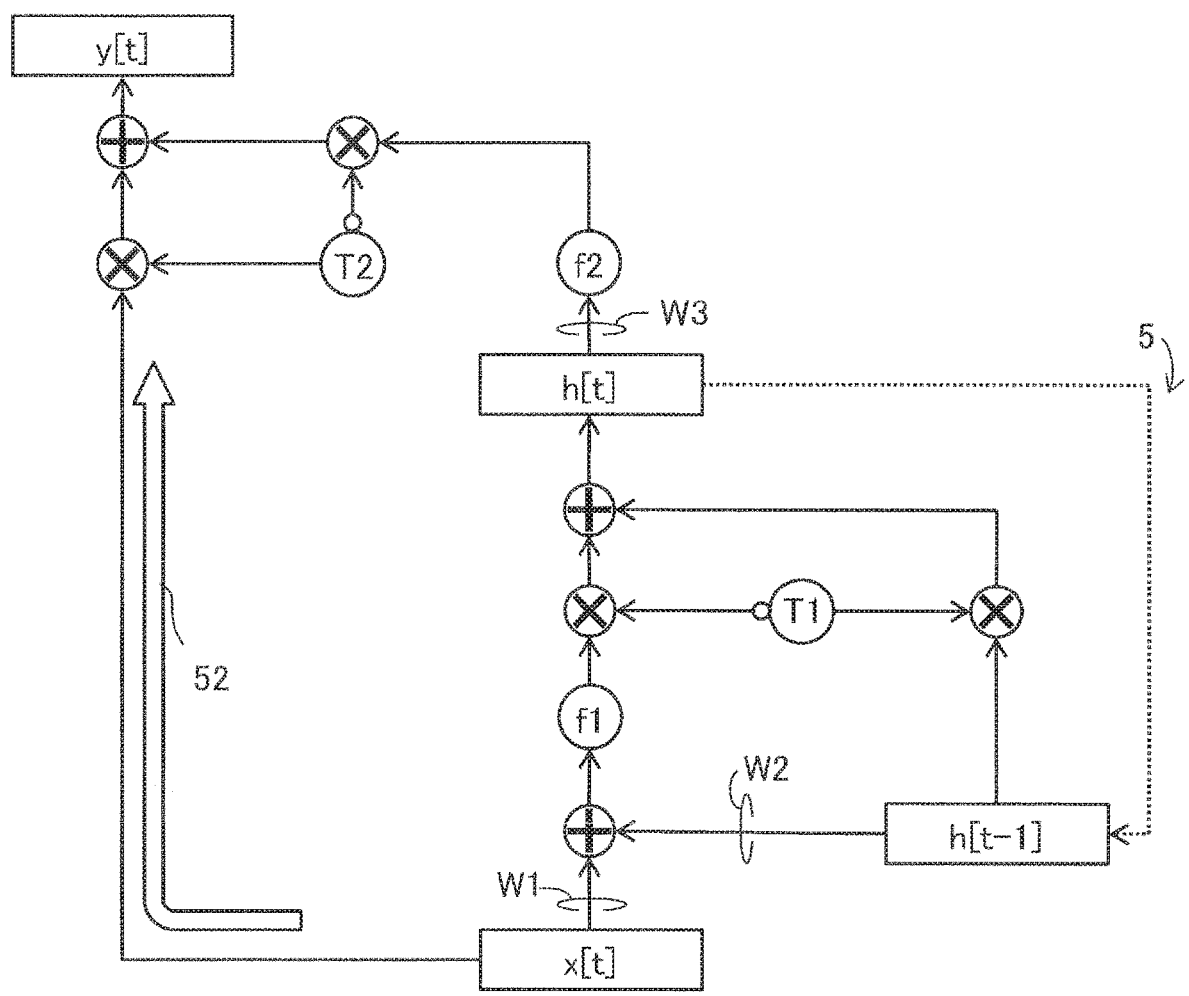
FIG. 6 is a diagram illustrating a calculation algorithm of an RHN according to a first modification of the second embodiment.

FIG. 6 is a diagram illustrating a calculation algorithm of an RHN 10B according to a first modification of the second embodiment. As illustrated in FIG. 6, in the RHN 10B, an activation function f2 having an argument "W3·h[t]" is added to the RHN 10A (FIG. 5) of the second embodiment. The activation function f2 performs nonlinear transformation on the linear transformation result of the intermediate variable h[t] for calculating the current output variable y[t].

According to the RHN 10B of the first modification, the state of $y[t]=x[t]$ can be achieved through the bypass 52 based on the transfer function T2 while the calculation processing of the activation function f2 is added.

Figure 7:
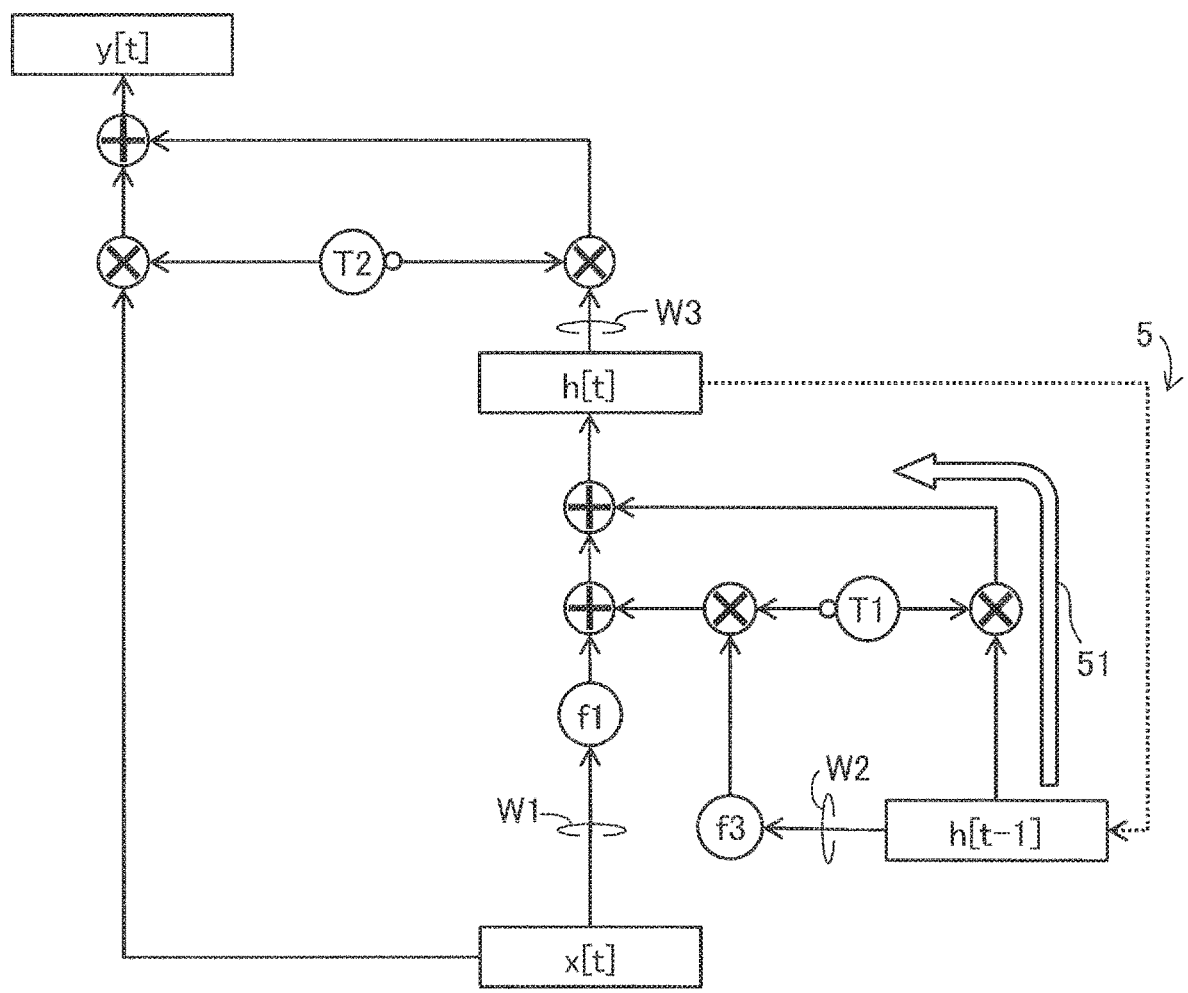
FIG. 7 is a diagram illustrating a calculation algorithm of an RHN according to a second modification of the second embodiment.

FIG. 7 is a diagram illustrating a calculation algorithm of an RHN 10C according to a second modification of the second embodiment. As illustrated in FIG. 7, in the RHN 10C, an activation function f3 having an argument "W2 h[t−1]" is added to the RHN 10A (FIG. 5) of the second embodiment. The activation function f3 performs nonlinear transformation on the linear transformation result of the previous intermediate variable h[t−1] separately from the transformation (f1) of the input variable x[t], during the calculation of the current intermediate variable h[t].

According to the RHN 10C of the second modification, the state of $h[t-1]=h[t]$ is achieved through the second path 51 based on the transfer function T1 while the calculation processing of the activation function f3 is added.

Similarly to the activation function f1 in the first embodiment, various specific forms can be used as the activation functions f2, f3 of the above modifications.

The same modification as the RHN 10C is not limited to the RHN 10A of the second embodiment, but may be performed on the RHN 10 of the first embodiment. The modifications similar to those of RHN 10B, RHN 10C may be applied to the following embodiments.

Third Embodiment

A third embodiment will be described below with reference to the drawings. Further to the RHN 10A of the second embodiment, an RHN 10D having a function of partially deleting the information about the past internal state will be described in the third embodiment.

The information processing device 2 of the third embodiment will be described below while the configuration and operation similar to those of the information processing device 2 of the first and second embodiments are appropriately omitted.

Figure 8:
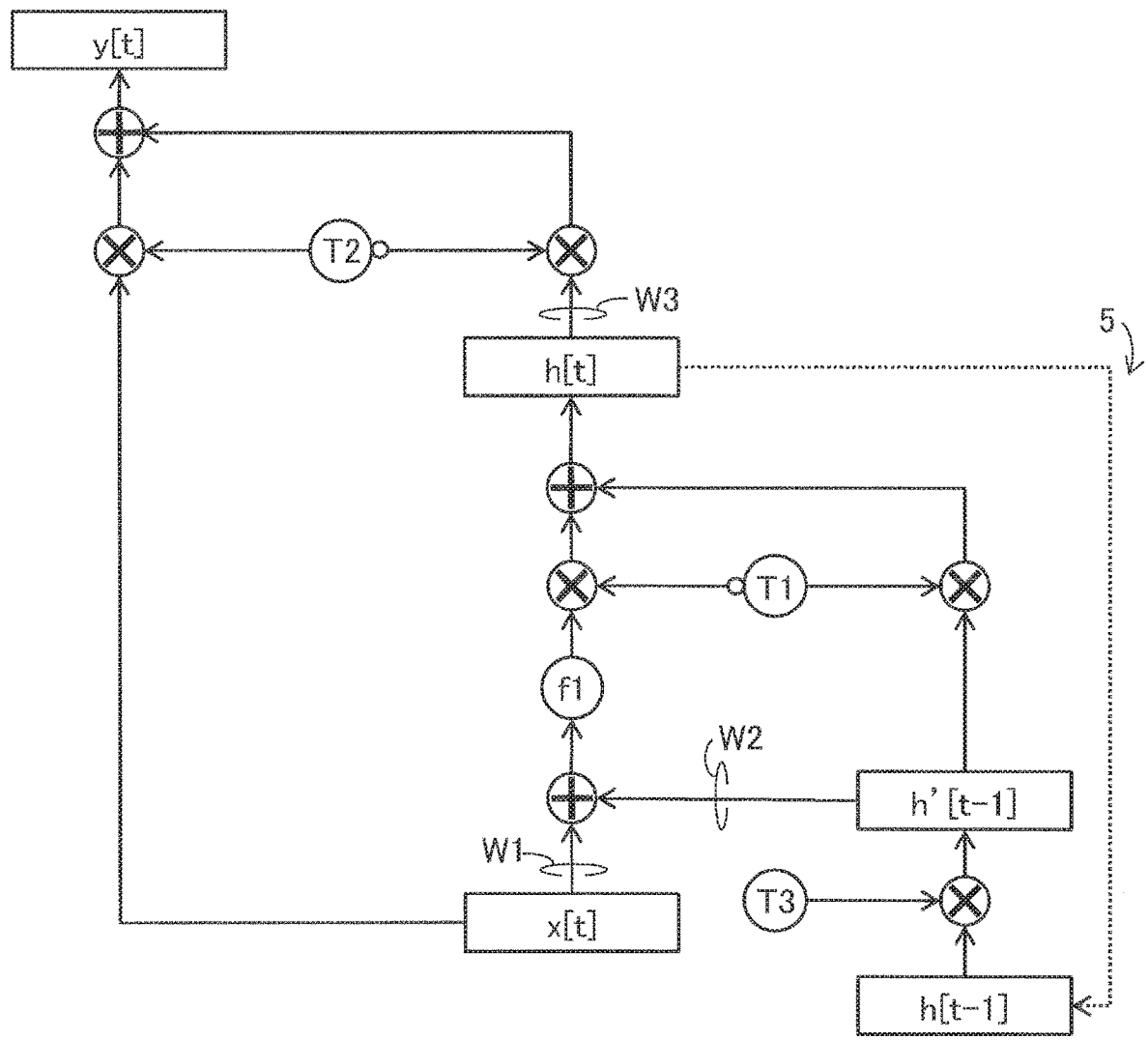
FIG. 8 is a diagram illustrating a calculation algorithm of an RHN according to a third embodiment.

FIG. 8 is a diagram illustrating a calculation algorithm of the RHN 10D of the third embodiment. In addition to the RHN 10A (FIG. 5) of the second embodiment, the RHN 10D of the third embodiment calculates the following equation (7) in the feedback loop 5 as illustrated in FIG. 8. The processor 20 further includes a forget gate that controls information referred to from the delayed intermediate variable h[t−1] as a functional configuration implementing the RHN 10D (corresponding to the calculation on the right side in the equation (7)).

$$h'[t-1]=T3 \times h[t-1] \tag{7}$$

In the equation (7), a transfer function T3 takes the current input variable x[t] and the previous output variable y[t−1] as the argument, for example. The transfer function T3 is defined by the following equation (8) using a parameter matrix W5.

$$T3=T3(x[t],y[t-1])=F(W5 \cdot z[t]) \tag{8}$$

The equation (8) uses the sigmoid function F(z) (see the equation (4)). The vector variable z[t] is a vector variable that is obtained by concatenating both the variables x[t] and y[t−1] so as to expand the vector space. For example, in a case where $x[t]=(1, 9, 5)^T$, $y[t]=(10, 43, 22)^T$ (a superscript "T" represents transposition), $z[t]=(1, 9, 5, 10, 43, 22)^T$ is obtained.

In order to implement the function of the RHN 10D of the third embodiment, the processor 20 as the forgetting gate uses the intermediate variable h'[t−1] (equation (7)) of the multiplication result of the transfer function T3, instead of the delayed intermediate variable h[t−1] for the calculation processing of the equation (1) in the order t. The corresponding component of the delayed intermediate variable h[t−1] is deleted (forgotten) by including a component having a value of 0 in the transfer function T3 based on the argument.

In the RHN 10D of the third embodiment, the information included in the delayed intermediate variable h[t−1] is deleted by the multiplication of the transfer function T3, so that the reference of the past internal state can be stopped at a proper time point.

For example, when the machine translation of the input sentence "watashi wa . . . (I am . . . )" proceeds to the words "watashi (I)" and "wa (am)", a word subsequent to "watashi wa (I am)" is considered to exist infinitely. In a case where the next word is translated, the information input in the past ("watashi" and "wa") is sometimes considered not to be particularly necessary. By explicitly deleting the information about the internal state using the transfer function T3 in such cases, the next word can be translated without depending on the past state. Consequently, the intuitively-matched machine translation is implemented, and translation performance can be improved.

In the information processing device 2 of the third embodiment, the processor 20 partially deletes the calculation result of the n-th intermediate variable h[n] based on the transfer function T3 being a third transfer function (equation (7)). The processor 20 calculates the (n+1)-th intermediate variable h[n+1] by using the calculation result h'[n] of the n-th intermediate variable partially deleted. Consequently, the reference of the past internal state can be stopped at a proper time point by partially deleting the calculation result of the n-th intermediate variable h[n] based on the transfer function T3.

Fourth Embodiment

A fourth embodiment will be described below with reference to the drawings. An RHN 10E in which the presence or absence of the nonlinear transformation with respect to the variables x[t], h[t−1], h[t] can be selected by various combinations will be described in the fourth embodiment.

The information processing device 2 of the fourth embodiment will be described below while the configuration and operation similar to those of the information processing device 2 of the first to third embodiments are appropriately omitted.

Figure 9:
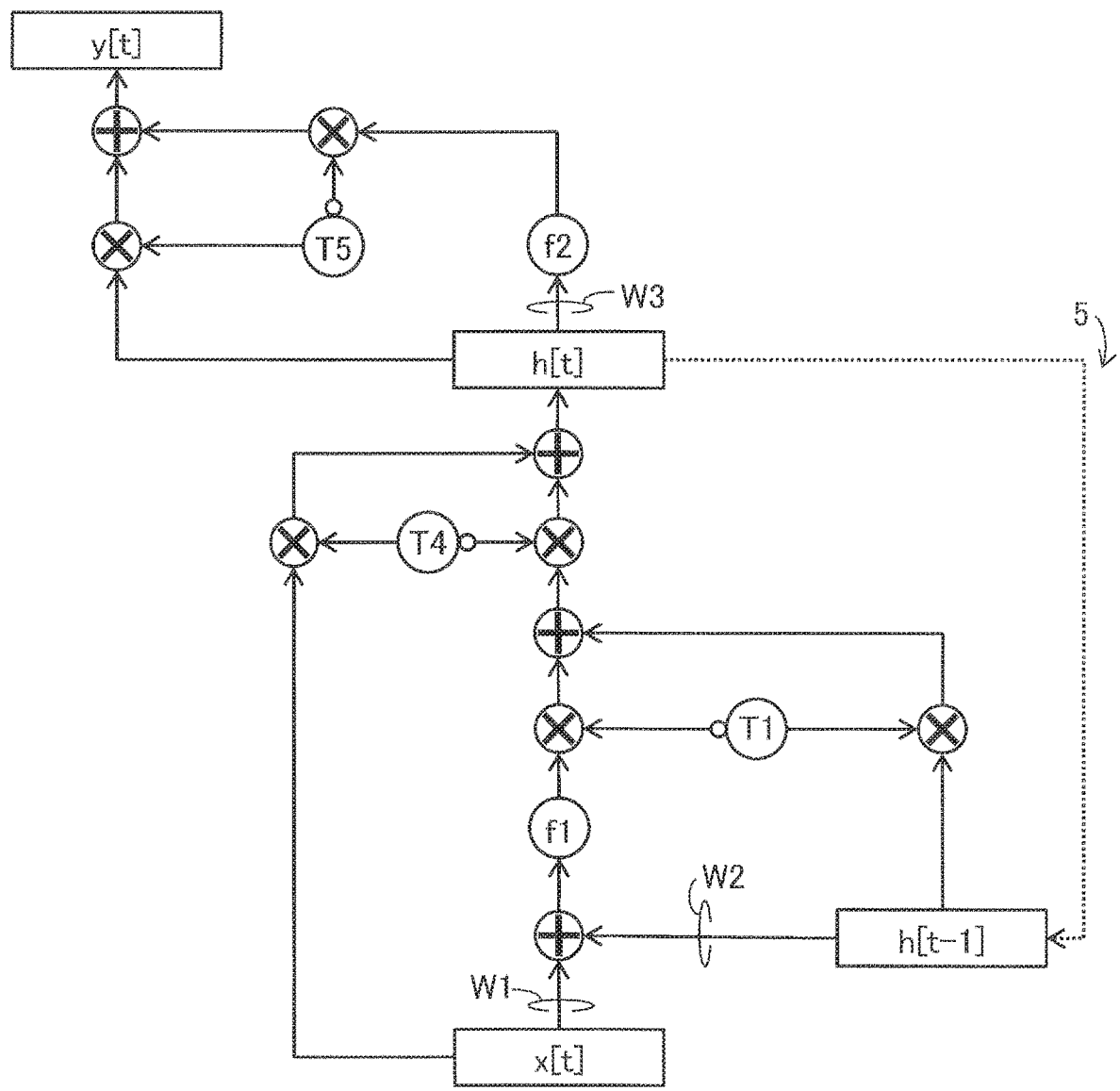
FIG. 9 is a diagram illustrating a calculation algorithm of an RHN according to a fourth embodiment.

FIG. 9 is a diagram illustrating a calculation algorithm of the RHN 10E of the fourth embodiment. The processor 20 performs the calculation processing according to the following equations (9) and (10) in order to calculate the t-th intermediate variable h[t] and the output variable y[t], thereby implementing the RHN 10E of the fourth embodiment.

$$h[t]=(1-T4)\times\{T1\times h[t-1]+(1-T1)\times f1\}+T4\times x[t] \quad (9)$$

$$y[t]=(1-T5)\times f2+T5\times h[t] \quad (10)$$

In the equations (9) and (10), each of transfer functions T4 and T5 is defined by the parameter group of the training object similarly to the transfer functions T1 and T2. The argument of the transfer function T4 is the current input variable x[t], the previous intermediate variable h[t−1], the output variable y[t−1], or a combination thereof, for example. The argument of the transfer function T5 is the current input variable x[t], the intermediate variable h[t], the previous output variable y[t−1], or a combination thereof, for example.

In the equation (9), it is assumed that the input variable x[t] and the intermediate variable h[t] have the same number of dimensions. In a case where the input variable x[t] and the intermediate variable h[t] have different numbers of dimensions, a linear transformation and the like are appropriately performed such that the number of dimensions of the second term in the equation (9) is matched with the number of dimensions of the intermediate variable h[t].

In the RHN 10E, during the calculation (equation (9)) of the intermediate variable h[t], the presence or absence of the nonlinear transformation with respect to the input variable x[t] is selected using the transfer function T4 in addition to the selection of the presence or absence of the nonlinear transformation with respect to the delayed intermediate variable h[t−1] using the transfer function T1. Further, the presence or absence of the nonlinear transformation with respect to the calculated intermediate variable h[t] is selected using the transfer function T5 during the calculation (equation (10)) of the output variable y[t].

As described above, the presence or absence of the nonlinear transformation with respect to various variables h[t−1], x[t], h[t] can be set using the transfer functions T1, T4, T5, which allows to eliminate the unnecessary nonlinear transformation to improve the efficiency of the information processing in the RHN 10E.

As described above, in the information processing device 2 of the fourth embodiment, upon calculating the (n+1)-th intermediate variable h[n+1], the processor 20 performs weighted sum of a value of the (n+1)-th input variable x[n+1] and a weighted summed value of the calculation result of the n-th intermediate variable h[n] and its transformation result. The weighting of the values is based on the transfer function T4 being a fourth transfer function (equation (9)). This enables the selection of the presence or absence of the transformation with respect to the input variable x[n+1] and the delayed intermediate variable h[n].

In the fourth embodiment, upon calculating the output variable y[t] for each ordinal number, the processor 20 performs the weighted sum in the weighting based on the transfer function T5 being a fifth transfer function. The processor 20 performs weighted sum of the intermediate variable h[t] of corresponding order and the transformed intermediate variable f2(W3 h[t]) of the order by the parameter matrix W3 (equation (10)), the weighting of the variables being based on as the above. This enables the selection of the presence or absence of the transformation with respect to the current intermediate variable h[t].

Although both the transfer functions T4 and T5 are used by way of example in the above description, only one of the transfer functions T4 and T5 may be used. In this case, the processor 20 can perform the calculation processing according to a calculation equation in which 0 is substituted for a transfer function that is not used in the transfer functions T4, T5 in the equations (9) and (10). This enables the selection of the presence or absence of the nonlinear transformation with respect to the input variable x[t], the intermediate variable h[t], or the delayed intermediate variable h[t−1].

Other Embodiments

As described above, the first to fourth embodiments have been described as examples of the technique disclosed in the present application. However, the technique of the present disclosure is not limited to the first to fourth embodiments, but can also be applied to embodiments in which modifications, substitutions, additions, omissions, and the like are appropriately made. It is also possible to combine the components described in the above embodiments to form a new embodiment. Other embodiments will be described below.

In the above embodiments, the weighted sum is performed in the complementary weighting based on one of the transfer functions T1, T2, T4, T5. The weighted sum method is not limited to this, but may be performed in the weighting based on a plurality of transfer functions. For example, a plurality of separately-set transfer functions P1, P2 may be used instead of T1, (1−T1) in the equation (1). Consequently, the information transmission through the first and second paths 50, 51 can independently be adjusted. The same holds for the weighted sum based on other transfer functions T2, T4, T5.

In the above embodiments, the deep neural network 1 that performs the machine translation is described by way of example. However, the machine translation may be performed by constructing another deep neural network. For example, an encoder/decoder type translation model may be used, or a multilayer may be appropriately constructed such that bi-directional LSTMs are combined in an interleaving manner (see Non-Patent Document 2). Even in this case, the information processing can efficiently be performed by incorporating the RHNs 10, 10A to 10E of the above embodiments.

In the above embodiments, the RHNs 10, 10A to 10E are incorporated in the deep neural network 1 in order to perform the machine translation by way of example. However, the present disclosure is not limited to this. The RHNs 10, 10A to 10E of the present disclosure can be used in any information processing, such as voice recognition and utterance prediction, which handles various time-series data.

In the above embodiments, the word series is described as an example of the time-series data. The time-series data is not limited to the word series, but may be a sequence of various data elements such as a character string in a sentence, a sequence of voice feature quantities in voice data, a frame sequence of a moving picture, and an adjacent pixel sequence of an image.

In the above embodiments, examples in which the RHNs 10, 10A to 10E are used while incorporated in the deep neural network 1 are described, but the present disclosure is not limited to this. Information processing may be performed by the neural network of single RHNs 10, 10A to 10E. The RHN of the present disclosure can be applied as any configuration that skips the calculation processing in the time-series direction of time-series data.

As described above, the embodiments have been described as an example of the technique in the present disclosure. To that end, the accompanying drawings and detailed description are provided.

Thus, some of the components described in the accompanying drawings and the detailed description can include not only components necessary for the solution of the problem but also components unnecessary for the solution of the problem. For this reason, it should not be recognized that the unnecessary components are imperative even if the unnecessary components are described in the accompanying drawings and detailed description.

Because the above-described embodiments are intended to exemplify the technique of the present disclosure, various modifications, substitutions, additions, omissions, and the like can be made within the scope of claims or the equivalent thereof.

INDUSTRIAL APPLICABILITY

The present disclosure is applicable to various information processing of time-series data based on the machine learning, for example, voice recognition processing and machine translation processing.

The invention claimed is:

1. An information processing device that acts as a neural network based on time-series data including data expressing a natural language, the information processing device comprising:
 a memory that stores an input variable having an ordinal number in time-series data and a parameter group for the neural network; and
 a processor that calculates an intermediate variable for each ordinal number based on the input variable having the ordinal number by performing transformation based on the parameter group, and calculates an output variable having the ordinal number based on the calculated intermediate variable,
 wherein upon calculating an (n+1)-th intermediate variable, the processor performs weighted sum of a calculation result of an n-th intermediate variable and a transformation result in which the n-th intermediate variable and an (n+1)-th input variable are transformed based on the parameter group, to calculate the (n+1)-th intermediate variable,
 wherein upon calculating the (n+1)-th intermediate variable, the processor performs weighted sum of a value of the (n+1)-th input variable and a weighted summed value of the calculation result of the n-th intermediate variable and the transformation result, the weighting of the values being based on one or more of fourth transfer functions,
 wherein the processor performs processing for at least one of machine translation of the natural language, voice recognition, and utterance prediction.

2. The information processing device according to claim 1, wherein upon calculating the (n+1)-th intermediate variable, the processor performs the weighted sum in weighting based on one or more of first transfer functions defined by the parameter group.

3. The information processing device according to claim 2, wherein an argument of the first transfer function includes at least one of an input variable whose ordinal number is identical or prior to the (n+1)-th, an intermediate variable whose ordinal number is identical or prior to the n-th, and an output variable whose ordinal number is identical or prior to the n-th.

4. The information processing device according to claim 1, wherein the processor calculates the output variable for each ordinal number by performing weighted sum of the input variable of corresponding order and the transformed intermediate variable of the order based on the parameter group, in weighting based on one or more of second transfer functions.

5. The information processing device according to claim 1,
 wherein the processor
 partially deletes the calculation result of the n-th intermediate variable based on a third transfer function, and
 calculates the (n+1)-th intermediate variable using the calculation result of the partially-deleted n-th intermediate variable.

6. The information processing device according to claim 1, wherein upon calculating the output variables for each ordinal number, the processor performs weighted sum of the intermediate variable of corresponding order and the transformed intermediate variable of the order using the parameter group, the weighting of the variables being based on one or more of fifth transfer functions.

7. An information processing method of time-series data including data expressing a natural language, performed by an information processing device that implements a function of a neural network,
 a parameter group for the neural network being stored in a memory of the information processing device,
 the information processing method of time-series data comprising;
 acquiring, by the information processing device, an input variable having an ordinal number in time-series data;
 calculating, by the information processing device, an intermediate variable for each ordinal number based on the input variable of corresponding order by performing transformation based on the parameter group;
 calculating, by the information processing device, an output variable for each ordinal number on the intermediate variable of corresponding order by performing transformation based on the parameter group,
 wherein upon calculating an (n+1)-th intermediate variable, the (n+1)-th intermediate variable is calculated by performing weighted sum of a calculation result of an n-th intermediate variable and a transformation result in which the n-th intermediate variable and an (n+1)-th input variable are transformed based on the parameter group,
 wherein upon calculating the (n+1)-th intermediate variable, weighted sum of a value of the (n+1)-th input variable and a weighted summed value of the calculation result of the n-th intermediate variable and the transformation result is performed, the weighting of the values being based on one or more of fourth transfer functions,
 wherein processing for at least one of machine translation of the natural language, voice recognition, and utterance prediction is performed.

8. A non-transitory recording medium storing a program causing an information processing device to perform the information processing method of time-series data according to claim 7.

9. An information processing device that acts as a neural network based on time-series data including data expressing a natural language, the information processing device comprising:

a memory that stores an input variable having an ordinal number in time-series data and a parameter group for the neural network; and a processor that calculates an intermediate variable for each ordinal number based on the input variable having the ordinal number by performing transformation based on the parameter group, and calculates an output variable having the ordinal number based on the calculated intermediate variable, wherein upon calculating an (n+1)-th intermediate variable, the processor performs weighted sum of a calculation result of an n-th intermediate variable and a transformation result in which the n-th intermediate variable and an (n+1)-th input variable are transformed based on the parameter group, to calculate the (n+1)-th intermediate variable, wherein upon calculating the output variables for each ordinal number, the processor performs weighted sum of the intermediate variable of corresponding order and the transformed intermediate variable of the order using the parameter group, the weighting of the variables being based on one or more of fifth transfer functions, wherein the processor performs processing for at least one of machine translation of the natural language, voice recognition, and utterance prediction.

10. The information processing device according to claim 9, wherein upon calculating the (n+1)-th intermediate variable, the processor performs the weighted sum in weighting based on one or more of first transfer functions defined by the parameter group.

11. The information processing device according to claim 10, wherein an argument of the first transfer function includes at least one of an input variable whose ordinal number is identical or prior to the (n+1)-th, an intermediate variable whose ordinal number is identical or prior to the n-th, and an output variable whose ordinal number is identical or prior to the n-th.

12. The information processing device according to claim 9, wherein the processor calculates the output variable for each ordinal number by performing weighted sum of the input variable of corresponding order and the transformed intermediate variable of the order based on the parameter group, in weighting based on one or more of second transfer functions.

13. The information processing device according to claim 9, wherein the processor partially deletes the calculation result of the n-th intermediate variable based on a third transfer function, and calculates the (n+1)-th intermediate variable using the calculation result of the partially-deleted n-th intermediate variable.

* * * * *